United States Patent
Jensen et al.

(10) Patent No.: US 10,272,597 B2
(45) Date of Patent: Apr. 30, 2019

(54) DEVICE FOR ABSORBING HEAT

(71) Applicant: Siemens Aktiengesellschaft, Munich (DE)

(72) Inventors: Martin Jensen, Aalborg (DK); Bendt Olesen, Klarup (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 445 days.

(21) Appl. No.: 14/710,011

(22) Filed: May 12, 2015

(65) Prior Publication Data
US 2015/0343669 A1 Dec. 3, 2015

(30) Foreign Application Priority Data
Jun. 2, 2014 (EP) .................................. 14170789

(51) Int. Cl.
B29C 33/02 (2006.01)
B29C 70/48 (2006.01)
(Continued)

(52) U.S. Cl.
CPC ............. B29C 33/02 (2013.01); B29C 35/16 (2013.01); B29C 70/44 (2013.01); B29C 70/48 (2013.01);
(Continued)

(58) Field of Classification Search
CPC .......... B29C 70/44; B29C 70/48; B29C 70/54
(Continued)

(56) References Cited

U.S. PATENT DOCUMENTS 3,042,574 A * 7/1962 Hochberg ........... B29C 43/3642
156/286
2003/0168164 A1* 9/2003 Blackmore ............. B28B 11/24
156/308.2
(Continued)

FOREIGN PATENT DOCUMENTS

CA 2887194 A1 5/2014
CN 103507277 A 1/2014
(Continued)

OTHER PUBLICATIONS

Angel Rodriguez Gil; "Manufacturing of Thick-Walled Composites"; Delft University of Technology; Retrieved on Dec. 11, 2014 from the Internet: URL:http://e-archivo.us3m.es/bitstream/handle/10016/10218/PFC_Angel_Rodriguez_Gil.pdf?sequence=2; XP002732465; pp. 1-126; 2010.

Primary Examiner — Joseph S Del Sole
Assistant Examiner — Mohamed K Ahmed Ali
(74) Attorney, Agent, or Firm — Beusse Wolter Sanks & Maire

(57) ABSTRACT

A device for absorbing heat generated by curing of a curable matrix material, particularly heat generated by curing of a curable matrix material embedding a textile structure including a number of reinforcing fibers is provided. The device includes at least one envelope element defining at least one inner volume, and at least one thermally conductive heat absorbing element disposed within the at least one inner volume of the at least one envelope element. In a further embodiment, the at least one envelope element may be built of or include at least one non-adhering material which does not adhere to the curable or cured matrix material.

18 Claims, 2 Drawing Sheets

(51) Int. Cl.
  *B29C 70/44*   (2006.01)
  *B29C 70/54*   (2006.01)
  *B29C 35/16*   (2006.01)
  *B29K 105/08*  (2006.01)
  *B29L 31/08*   (2006.01)

(52) U.S. Cl.
  CPC ...... *B29C 70/54* (2013.01); *B29K 2105/0809* (2013.01); *B29K 2827/18* (2013.01); *B29K 2903/04* (2013.01); *B29K 2995/0013* (2013.01); *B29L 2031/085* (2013.01)

(58) Field of Classification Search
  USPC .............................. 264/571; 425/403; 165/46
  See application file for complete search history.

(56) References Cited

U.S. PATENT DOCUMENTS

| | | | |
|---|---|---|---|
| 2005/0086916 A1* | 4/2005 | Caron ..................... | B29C 43/12 |
| | | | 55/382 |
| 2012/0067511 A1 | 3/2012 | Chase et al. | |
| 2016/0129676 A1* | 5/2016 | Samejima ............ | B29C 70/443 |
| | | | 187/401 |

FOREIGN PATENT DOCUMENTS

| | | |
|---|---|---|
| DE | 102012219226 A1 | 4/2014 |
| GB | 2310162 A | 8/1997 |
| WO | 2011115716 A1 | 9/2011 |

* cited by examiner

DEVICE FOR ABSORBING HEAT

CROSS REFERENCE TO RELATED APPLICATIONS

This application claims the benefit of European Application No. EP14170789, filed Jun. 2, 2014, incorporated by reference herein in its entirety.

FIELD OF INVENTION

The invention relates to a device for absorbing heat generated by curing of a curable matrix material, particularly heat generated by curing of a curable matrix material embedding a textile structure comprising a number of reinforcing fibres.

BACKGROUND OF INVENTION

Composite parts, e.g. rotor blades of wind turbines, typically include a cured, polymer based matrix material embedding at least one textile structure comprising a number of reinforcing fibres.

Thus, the manufacturing of respective composite parts includes curing a curable matrix material embedding at least one textile structure having a number of reinforcing fibres. The curing of the curable matrix material may be an exothermic process which may lead to a significant generation of heat. The generated heat may negatively affect the structural integrity or properties, respectively of the composite part especially due to thermally induced delamination of the textile structures and/or thermally induced degradation of textile structures or other elements of the composite part embedded within the matrix material, for instance.

SUMMARY OF INVENTION

Therefore, it is an object of the invention to provide a measure allowing for a concerted absorption of heat generated by curing of a curable matrix material while manufacturing respective composite parts.

This object may be achieved by a device for absorbing heat generated by curing of a curable matrix material, particularly heat generated by curing of a curable matrix material embedding a textile structure including a number of reinforcing fibres, which includes at least one envelope element defining at least one inner volume, and at least one thermally conductive heat absorbing element disposed within the at least one inner volume of the at least one envelope element.

The device according to an embodiment of the invention allows for a concerted, efficient, and reliable absorption of heat generated by curing of a curable matrix material, typically a curable polymer matrix material, e.g. an epoxy-, polyester-, or vinyl ester based resin, while manufacturing respective composite parts, e.g. rotor blades for wind turbines. Due to the absorption of heat generated by curing of the curable matrix material, thermal influences, particularly heat peaks, which might lead to the aforementioned thermally induced delamination and/or degradation effects, may be avoided since heat generated by curing of the matrix material is removed from the composite structure forming the composite part to be manufactured or the manufactured composite part, respectively.

In order to absorb heat generated by curing of the matrix material, the device according to an embodiment of the invention is arranged or disposed at the composite structure forming the composite part to be manufactured before or while curing of the matrix material so that an absorption of heat is possible. In other words, a device according to an embodiment of the invention is arranged or disposed at the composite structure forming the composite part to be manufactured in such a manner that a thermal contact allowing for an absorption of heat from the composite structure forming the composite part to be manufactured is established. After curing of the matrix material has finished, the device is typically removed from the composite part.

Arranging or disposing the device typically, includes placing the device on a surface of the composite structure forming the composite part to be manufactured. Thereby, the device may be temporarily attached to the composite structure. However, it is also possible that the device is at least partially placed within the composite structure, i.e. at least partially integrated within the composite structure.

The spatial dimensions, i.e. particularly shape and size, of the device, therefore, should be adapted to the spatial dimensions, i.e. particularly shape and size, of the composite part to be manufactured. Thereby, it is advisable that the device is dimensioned and/or shaped in such a manner that at least regions in which a particular generation of heat is expected or known are contacted with the device. Both aspects imply that a certain structural flexibility of the device is of advantage so that its shape may be easily, i.e. particularly manually, and preferably also reversibly adapted to the shape of the composite part to be manufactured.

As mentioned above, the device includes at least one envelope element and at least one heat absorbing element, in one embodiment.

The envelope element defines at least one inner volume and therefore, may be deemed as a casing or housing for the at least one heat absorbing element. The envelope element may include a number of separate or communicating inner volumes each forming a compartment for at least one heat absorbing element. Generally, the envelope element has the function to encase or house the at least one heat absorbing element. The shape of the envelope element, i.e. particularly the shape of the inner volumes of the envelope element, is typically adapted to the shape of respective heat absorbing elements which are to be accommodated within the envelope element.

A respective heat absorbing element is built of or includes at least one thermally conductive material having comparatively good heat absorbing properties, i.e. allowing for comparatively high heat fluxes. Generally, the heat absorbing element has the function to absorb heat generated by curing of the curable matrix material, particularly while manufacturing a respective composite part. The shape of a respective heat absorbing element is typically plane, i.e. (essentially) two-dimensional, allowing for stacking of heat absorbing elements upon each other which will be mentioned below in association with further embodiments of the device in more detail.

According to a preferred embodiment, the at least one envelope element is built of or includes at least one non-adhering material which does not adhere to the curable or cured matrix material. In such a manner, the envelope element will not adhere to the composite part and therefore, may be easily removed from the composite part after curing of the matrix material has finished. Non-adhering of the envelope element is particularly, based on a chemical incompatibility between the non-adhering material and the matrix material. The non-adhering material may be built of or may include at least one fluoropolymer, particularly polytetrafluoroethylene (PTFE), and/or at least one polyolefinic material, particularly polyethylene and/or polypropylene, for instance.

As mentioned above, it is preferred that the envelope element has a certain structural flexibility so that it may be easily, i.e. particularly manually, and preferably also reversibly three-dimensionally shaped. Therefore, the at least one envelope element is preferably made of at least one flexible material. Flexible materials relate both to materials having material-immanent structural flexible properties, e.g. elastomeric polymers, and to materials which do not necessarily have material-immanent structural flexible properties however, are flexible due to a specific constructive design, i.e. due to comparatively low wall thickness, recesses, etc., for instance.

In such a manner, the at least one envelope element may be built of or include at least one foil. The foil may have a single- or multi-layered structure, particularly including diverse functional layers, e.g. non-adhering outer layers, which may be built of or include respective non-adhering materials as mentioned above. The foil may be based on a polymer, e.g. a polyolefinic polymer, such as polyethylene or polypropylene, or a metal, e.g. aluminium.

According to a further embodiment, the device includes a number of heat absorbing elements, i.e. at least two heat absorbing elements are provided. In this case, the at least two heat absorbing elements are preferably stacked. Stacking of respective heat absorbing elements typically implies a parallel arrangement of respective heat absorbing elements, i.e. the heat absorbing elements are arranged in different levels upon each other. As has been mentioned above, the heat absorbing elements therefore, typically have a plane, particularly (essentially) two-dimensional, shape. Stacked heat absorbing elements do not necessarily have to be orientated in same manner, i.e. when emanating from rectangular heat absorbing elements, for instance the short or long sides of respective stacked heat absorbing elements do not necessarily have to be in a parallel arrangement.

Emanating from the aforementioned embodiment according to which the device includes a number of, i.e. at least two, heat absorbing elements, the heat absorbing elements do not necessarily have to have the same chemical and/or physical properties. Regarding the thermal properties, e.g. particularly the thermal conductivity, a first heat absorbing element may have a higher thermal conductivity compared with a second or further heat absorbing element. A respective first heat absorbing element may be built of or include highly thermally conductive fibres, e.g. carbon fibres, a respective second heat absorbing element may be built of or include less highly thermally conductive fibres, e.g. aramid and/or glass fibres, for instance. By a concerted arrangement of heat absorbing elements of different thermal properties, e.g. particularly different thermal conductivities, the thermal properties, e.g. particularly the thermal conductivity, of the entire device may be individually adapted or influenced, respectively. Hence, the device does not have to have consistent thermal properties, e.g. particularly a consistent thermal conductivity, but may include regions of different thermal properties, e.g. particularly different thermal conductivities, which may be of advantage when heat peaks originating from the curing of a curable material occur only locally.

Hence, with regard to the aforementioned stacked arrangement of heat absorbing elements, it is possible that layers of the stack differ in thermal properties, e.g. particularly in thermal conductivity. Thereby, at least one respective first heat absorbing element may alternate with at least one respective second heat absorbing element. Thus, adjacent layers of a respective stack of heat absorbing elements may differ in thermal properties, e.g. particularly in thermal conductivity.

In the case that at least two heat absorbing elements are provided, a first heat absorbing element may have different spatial dimensions compared with a second or further heat absorbing element. Hence, the heat absorbing elements, i.e. at least two heat absorbing elements, may have different spatial dimensions. As an example, a first heat absorbing element may be longer and/or wider and/or higher than a second or further heat absorbing element. This also implies that heat absorbing elements may only differ in height, i.e. in thickness. By a concerted arrangement of heat absorbing elements of different spatial dimensions, the thermal properties, e.g. particularly the thermal conductivity, of the entire device may also be individually adapted or influenced, respectively.

In the case that at least two heat absorbing elements are provided, at least one first heat absorbing element may also be displaced relative to at least one second or further heat absorbing element in longitudinal direction of the device and/or the or at least one first heat absorbing element may be displaced relative to at least one second or further heat absorbing element in transversal direction of the device. This also implies that at least two heat absorbing elements may be differently aligned and/or orientated relative to each other. By a concerted displacement of heat absorbing elements relative to each other in longitudinal direction, which refers to an axis coinciding with or parallel to the longitudinal axis of the device, and/or in transversal direction, which refers to an axis coinciding with or parallel to the transversal axis of the device, the thermal properties, e.g. particularly the thermal conductivity, of the entire device may also be individually adapted or influenced, respectively.

According to a preferred embodiment, the at least one heat absorbing element is built of or includes at least one fibre material, particularly at least one fibre material containing aramid fibres and/or carbon fibres and/or glass fibres. With regard to the use as respective heat absorbing elements, fibre materials show good chemical and physical, e.g. particularly mechanical and thermal, properties since they are highly flexible and have comparatively good thermal properties, e.g. particularly good thermally conductive properties. Good thermal properties are particularly given for carbon fibres, which have a significant higher thermal conductivity than aramid and glass fibres. The mentioned fibre materials may be provided as fabrics or textiles, e.g. as uniaxial, biaxial, triaxial, etc. fabric mats or textile mats.

The at least one fibre material may at least partially be built of or include cutting scrap from cutting textile structures including a number of reinforcing fibres for a composite part, i.e. particularly a rotor blade for a wind turbine. Hence, respective cutting scrap may be used as heat absorbing elements which is an economic, e.g. cost-neutral, approach for building heat absorbing elements for devices according to an embodiment of the invention.

Apart from using fibre materials for building respective heat absorbing elements, it is also possible that at least one heat absorbing element is built of or includes at least one metal, particularly aluminium or copper. Metals are of advantage due to their good thermal properties, e.g. particularly thermal conductivity, however, they are typically less flexible compared with respective fibre materials.

According to a further embodiment, at least one heat absorbing element is at least partially covered with at least one non-adhering material. This both applies to heat absorbing elements built of or including at least one fibre material and heat absorbing elements built of or including at least one metal. The covering, which also embraces coating, of heat absorbing elements with a non-adhering material avoids that heat absorbing elements adhere together which may be of disadvantage in terms of handling and shaping the device, for instance. The non-adhering material may be built of or may include at least one fluoropolymer, particularly polytetrafluoroethylene (PTFE), and/or at least one polyolefinic material, particularly polyethylene and/or polypropylene.

An embodiment of the invention also relates to an apparatus for manufacturing a composite part, particularly a rotor blade for a wind turbine, the composite part includes a curable or cured matrix material embedding at least one textile structure including a number of reinforcing fibres. The apparatus includes at least one mould, including a shaping mould cavity for accommodating at least one textile structure having a number of reinforcing fibres and at least one curable matrix material embedding the textile structure, and at least one device for absorbing heat generated by curing of a curable matrix material as specified above. Therefore, all annotations regarding the device also apply to the apparatus. The apparatus may be adapted to manufacture a respective composite part by a vacuum assisted resin transfer moulding process (VARTM-process).

Furthermore, a further embodiment of the invention relates to a method for manufacturing a composite part, particularly a rotor blade for a wind turbine, the composite part comprising a cured matrix material embedding at least one textile structure comprising a number of reinforcing fibres, wherein an apparatus as specified above is used for manufacturing the composite part. Therefore, all annotations regarding the device and the apparatus also apply to the method. The method may be a vacuum assisted resin transfer moulding process (VARTM-process) for manufacturing a respective composite part.

BRIEF DESCRIPTION OF THE DRAWINGS

Specific embodiments of the invention will be described in detail herein below with reference to the figures, wherein.

DETAILED DESCRIPTION OF INVENTION

Figure 1:
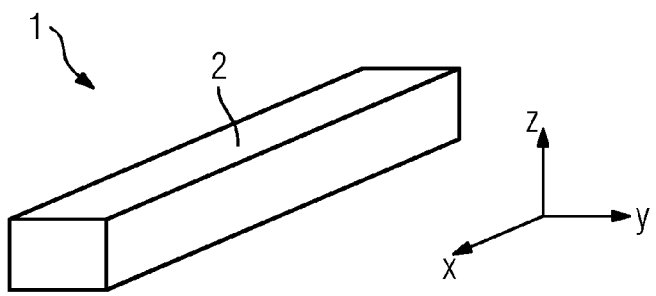
FIG. 1-5 show a principle drawing of an embodiment of a device for absorbing heat generated by curing of a curable matrix material according to an exemplary embodiment of the invention.

FIG. 1 shows a principle drawing of a device 1 for absorbing heat generated by curing of a curable matrix material, particularly heat generated by curing of a curable matrix material embedding a textile structure comprising a number of reinforcing fibres, according to an exemplary embodiment of the invention. FIG. 1 shows a perspective view of the device 1.

The longitudinal dimensions of the device 1, i.e. the length of the device 1, extends in x-direction, the transversal dimensions of the device 1, i.e. the width of the device 1, extends in y-direction, and the height of the device 1, i.e. the thickness of the device 1, extends in z-direction.

The device 1 is to be used during manufacturing of a composite part 6, e.g. a rotor blade for a wind turbine, whereby a textile structure comprising a number of reinforcing fibres, e.g. glass fibres, is infused with, i.e. embedded in, a curable matrix material, e.g. a curable polymer material, e.g. an epoxy-based resin. Curing of the curable matrix material may involve exothermic processes and therefore, may lead to the generation of heat which has to be removed from the composite part 6 in order to avoid or reduce thermally induced delamination and/or degradation effects.

Figure 2:
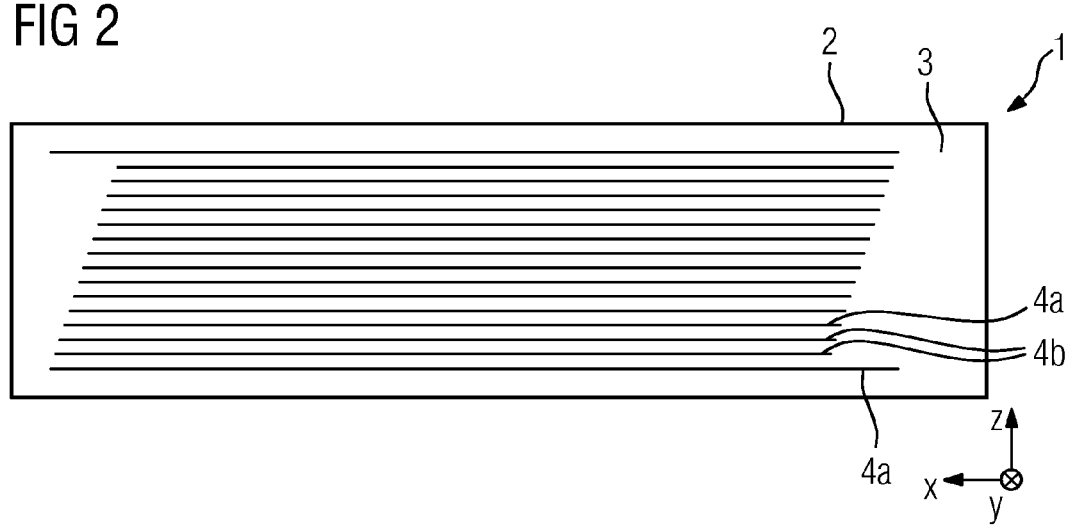

As is particularly discernible from FIG. 2 showing a longitudinal cut-view of the device 1, the device 1 comprises an envelope element 2 defining at least one inner volume 3, and a number of thermally conductive heat absorbing elements 4 disposed within the inner volume 3 of the envelope element 2.

The envelope element 2 serves as a casing or housing for the heat absorbing elements 4 disposed within the inner volume 3. The envelope element 2 is made of a non-adhering material, i.e. a material having non-adhering properties with regard to the curable or cured matrix material. The non-adhering material is preferably built of a fluoropolymer, e.g. polytetrafluoroethylene (PTFE). The non-adhering material is provided as a foil and therefore, highly flexible.

The heat absorbing elements 4 serve for removing heat from the composite part 6 to be manufactured originating from curing of the matrix material. Therefore, the heat absorbing elements 4 are built of a thermally conductive material having comparatively good heat absorbing properties, i.e. allowing for comparatively high heat fluxes. Appropriate materials for building the heat absorbing elements 4 are particularly, fibre materials such as carbon fibres and/or glass fibres. The fibre materials may be provided as flexible fabrics or textiles, e.g. as uniaxial, biaxial, triaxial, etc. fabric mats or textile mats.

The shape of the heat absorbing elements 4 is plane, i.e. (essentially) two-dimensional, allowing for a stacked arrangement of the heat absorbing elements 4, in which heat absorbing elements 4 are stacked upon each other (cf. e.g. FIG. 2, 3).

Thereby, heat absorbing elements 4 of different chemical and/or physical properties may be provided. Particularly, heat absorbing elements 4 of different thermal properties, e.g. different thermal conductivities, may be provided, which is depicted in FIG. 2 showing an arrangement of layers of a first heat absorbing element 4a alternating with two layers of a second heat absorbing element 4b, whereby respective first heat absorbing elements 4a, which are built of carbon fibres, have a significantly higher thermal conductivity compared with respective second heat absorbing elements 4b, which are built of glass fibres.

As is discernible from FIG. 2, the stack of heat absorbing elements 4 is slightly inclined in the longitudinal direction of the device 1 (cf. x-direction). This displacement is based on a concerted displacement of the heat absorbing elements 4 in longitudinal direction of the device 1. Thereby, the heat absorbing elements 4 are displaced with a given factor, e.g. by ca. 0, 5% of their length. Hence, in the exemplary case of the heat absorbing elements 4 each having a length of ca. 3700 mm, respective directly adjacently disposed heat absorbing elements 4 may be displaced by ca. 20 mm in longitudinal direction (x-direction).

Figure 3:
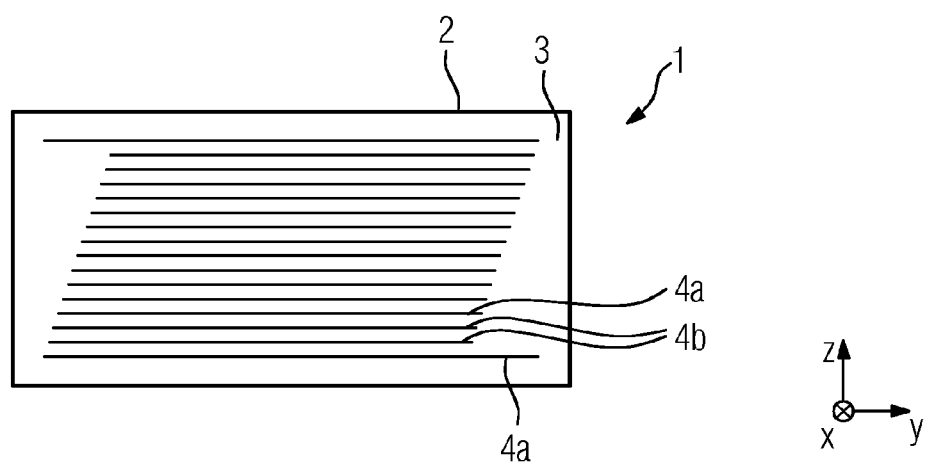

As is discernible from FIG. 3, which shows a principle drawing of a device 1 according to an exemplary embodiment of the invention in a transversal cut-view, i.e. a cross-sectional view, a stack of heat absorbing elements 4 may also be slightly inclined in the transversal direction of the device 1 (cf. y-direction). This displacement is based on a concerted displacement of the heat absorbing elements 4 in transversal direction of the device 1. Thereby, the heat absorbing elements 4 are displaced with a given factor, e.g. by ca. 5% of their width. Hence, in the exemplary case of the heat absorbing elements 4 each having a width of ca. 100 mm, respective directly adjacently disposed heat absorbing elements 4 may be displaced by ca. 5 mm in transversal direction (y-direction).

Figure 4:
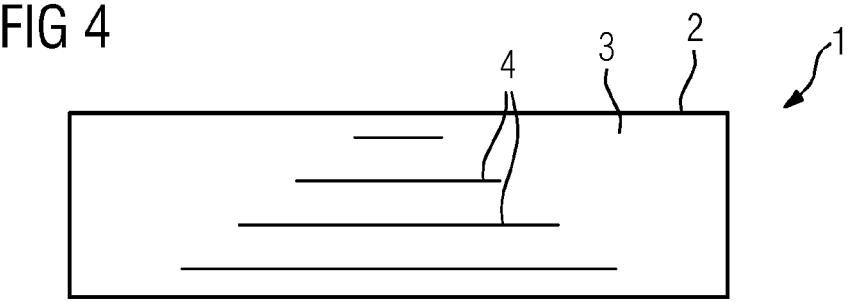

As is discernible from FIG. 4, which shows a principle drawing of a device 1 according to a further exemplary embodiment of the invention in a longitudinal cut-view, heat absorbing elements 4 of different dimensions may be provided. According to the embodiment of FIG. 4, heat absorbing elements 4 of different longitudinal dimensions, i.e. heat absorbing elements 4 of different length, may be provided in a stacked arrangement.

Figure 5:
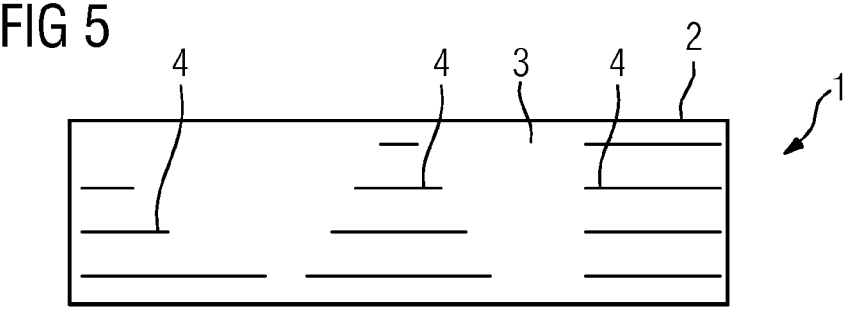

As is discernible from FIG. 5, which shows a principle drawing of a device 1 according to a further exemplary embodiment of the invention in a longitudinal cut-view, also heat absorbing elements 4 of different dimensions may be provided. According to the embodiment of FIG. 5, heat absorbing elements 5 of different longitudinal dimensions, i.e. heat absorbing elements 4 of different length, may be provided in separate stacked arrangements.

Of course, respective displacements of heat absorbing elements 4 are also feasible in transversal direction or combined with displacements in transversal direction. Displacing respective heat absorbing elements 4 in longitudinal and/or transversal direction of the device 1, may also be combined with providing heat absorbing elements 4 of different chemical and/or physical properties, i.e. particularly different thermal properties, allowing for an individual adaption of the chemical and/or physical properties, i.e. particularly different thermal properties. Generally, technical aspects of all embodiments may be combined.

Figure 6:
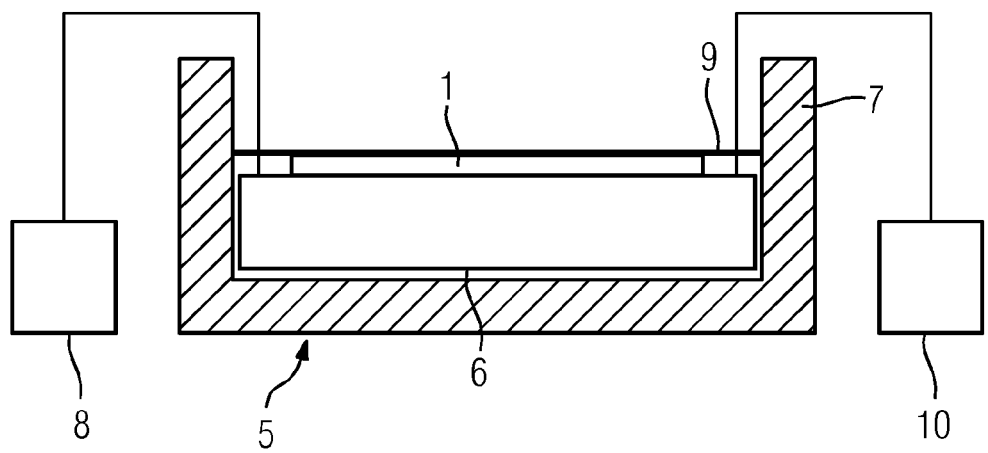
FIG. 6 shows a principle drawing of an embodiment of an apparatus for manufacturing a composite part according to an exemplary embodiment of the invention.

FIG. 6 shows a principle drawing of an apparatus 5 for manufacturing a composite part 6, particularly a rotor blade for a wind turbine, the composite part 6 comprising a curable or cured matrix material embedding at least one textile structure comprising a number of reinforcing fibres, according to an exemplary embodiment of the invention.

The apparatus 5 comprises a mould 7, comprising a shaping mould cavity for accommodating at least one textile structure comprising a number of reinforcing fibres and at least one curable matrix material embedding the textile structure, a matrix material injection means 8 capable of injecting a curable matrix material to a composite structure forming the composite part 6 to be manufactured, a vacuum bag 9 covering the freely exposed surface of the composite structure forming the composite part 6 to be manufactured so as to build a vacuum chamber, a vacuum generating means 10, e.g. a vacuum pump, for generating a vacuum in the vacuum chamber, and a device 1. As is discernible, the or at least one device 1 is directly placed on top of the composite part 6 thereby, allowing for removing heat generated by curing of the curable matrix material. Under an applied vacuum, the device 1 is pressed towards the composite structure and the shape of the device 1 is hereby adapted to the shape of the composite part 6.

The apparatus 5 according to FIG. 6 may be implemented in a method for manufacturing a composite part 6, particularly a rotor blade for a wind turbine, the composite part 6 comprising a cured matrix material embedding at least one textile structure comprising a number of reinforcing fibres.

Although the present invention has been described in detail with reference to the preferred embodiment, the present invention is not limited by the disclosed examples from which the skilled person is able to derive other variations without departing from the scope of the invention.

The invention claimed is:

1. A device for absorbing heat generated by curing of a curable matrix material, wherein the device comprises:
   at least one envelope element fully defining at least one inner volume inside the at least one envelope element, and
   at least two thermally conductive heat absorbing elements stacked one atop another and disposed within the at least one inner volume of the at least one envelope element,
   wherein the at least one envelope element is built of or comprises a non-adhering material which does not adhere to the curable matrix material or to cured matrix material, wherein the at least two thermally conductive heat absorbing elements are at least partially covered with a respective non-adhering material, and wherein the at least one envelope element is free to move relative to the at least two thermally conductive heat absorbing elements.

2. The device according to claim 1, wherein the non-adhering material of the at least one envelope element is built of or comprises at least one fluoro-polymer, and/or at least one polyolefinic material.

3. The device according to claim 1, wherein the at least one envelope element is built of or comprises at least one flexible material.

4. The device according to claim 1, wherein the at least one envelope element is built of at least one foil.

5. The device according to claim 1, whereby a first heat absorbing element comprises a higher thermal conductivity compared with a second heat absorbing element.

6. The device according to claim 1, whereby a first heat absorbing element comprises different spatial dimensions compared with a second heat absorbing element.

7. The device according to claim 1, wherein at least one first heat absorbing element is displaced relative to at least one second heat absorbing element in longitudinal direction of the device and/or the at least one first heat absorbing element is displaced relative to the at least one second heat absorbing element in transversal direction of the device.

8. The device according to claim 1, wherein the at least two thermally conductive heat absorbing elements are built of or comprise at least one fibre material.

9. The device according to claim 1, wherein the at least two thermally conductive heat absorbing elements are built of or comprise at least one metal.

10. An apparatus for manufacturing a composite part, the composite part comprising a curable or cured matrix material embedding at least one textile structure comprising a number of reinforcing fibres, wherein the apparatus comprises:
    at least one mould, comprising a vacuum bag and a shaping mould cavity configured to shape the at least one textile structure comprising the number of reinforcing fibres and at least one curable matrix material embedding the at least one textile structure, and
    at least one device disposed within the shaping mould cavity between the composite part and the at least one mould, wherein the at least one device comprises at least one envelope element fully defining at least one inner volume inside the at least one envelope element, and at least two thermally conductive heat absorbing elements stacked one atop another and disposed within the at least one inner volume of the at least one envelope element,
    wherein the at least one envelope element is built of or comprises a non-adhering material which does not adhere to the curable matrix material or to cured matrix material, wherein the at least two thermally conductive heat absorbing elements are at least partially covered with a respective non-adhering material, and wherein the at least one envelope element is free to move relative to the at least two thermally conductive heat absorbing elements.

11. The device of claim 1, the curable matrix material embedding a textile structure comprising a number of reinforcing fibres.

12. The device of claim 2, wherein the at least one fluoro-polymer comprises polytetrafluoroethylene.

13. The device of claim 2, wherein the at least one polyolefinic material comprises polyethylene and/or polypropylene.

14. The device of claim 8, wherein the at least one fibre material comprises aramid fibres and/or carbon fibres and/or glass fibres.

15. The device of claim 9, wherein the at least one metal comprises aluminium or copper.

16. The apparatus of claim 10, wherein the at least one mould is configured for manufacturing a rotor blade for a wind turbine.

17. The device according to claim 1, wherein the at least two thermally conductive heat absorbing elements are free to move relative to each other.

18. The apparatus of claim 10, wherein the at least one device is disposed directly on the composite part.

* * * * *